(12) United States Patent
Furlotti

(10) Patent No.: US 7,648,017 B2
(45) Date of Patent: Jan. 19, 2010

(54) APPARATUS AND METHOD FOR FEEDING POUCHES AND SPOUTS FOR PROCESSING

(75) Inventor: Filippo Furlotti, Parma (IT)

(73) Assignee: Indag Gesellschaft fur Industriebedarf mbH & Co. Betriebs KG, Eppelheim (DE)

( * ) Notice: Subject to any disclaimer, the term of this patent is extended or adjusted under 35 U.S.C. 154(b) by 389 days.

(21) Appl. No.: 11/575,475

(22) PCT Filed: Sep. 17, 2004

(86) PCT No.: PCT/IT2004/000506

§ 371 (c)(1),
(2), (4) Date: Mar. 16, 2007

(87) PCT Pub. No.: WO2006/030464

PCT Pub. Date: Mar. 23, 2006

(65) Prior Publication Data

US 2008/0283363 A1 Nov. 20, 2008

(51) Int. Cl.
*B65G 47/24* (2006.01)
*B65G 47/84* (2006.01)
*B65B 43/46* (2006.01)

(52) U.S. Cl. .............................. 198/377.08; 198/471.1; 198/803.5; 141/114; 141/144; 414/737

(58) Field of Classification Search .................................
198/377.02–377.04, 377.06–377.08, 377.1,
198/470.1, 471.1, 474.1, 803.3, 803.5; 414/737;
141/10, 114, 129, 144
See application file for complete search history.

(56) References Cited

U.S. PATENT DOCUMENTS

| | | | | |
|---|---|---|---|---|
| 3,851,751 | A * | 12/1974 | Jones | 198/803.5 |
| 4,643,633 | A | 2/1987 | Lashyro | |
| 4,874,076 | A * | 10/1989 | Kaplan et al. | 198/357 |
| 5,421,447 | A * | 6/1995 | Ruth et al. | 198/377.1 |
| 6,244,307 | B1 | 6/2001 | Araki et al. | |
| 6,651,800 | B2 * | 11/2003 | Baclija et al. | 198/395 |

FOREIGN PATENT DOCUMENTS

| EP | 1 167 011 A | 1/2002 |
|---|---|---|
| EP | 1 291 162 A | 3/2003 |

OTHER PUBLICATIONS

International Search Report in International Patent Application No. PCT/IT2004/000506, dated Jan. 21, 2005.

* cited by examiner

*Primary Examiner*—Mark A Deuble
(74) *Attorney, Agent, or Firm*—Stroock & Stroock & Lavan LLP

(57) ABSTRACT

The invention relates to a system for feeding pouches and spouts to an apparatus for processing same. A system in accordance with an embodiment of the invention can feed pouches and spouts to a rotary machine simultaneously. More specifically, the system can provide a transferring assembly for grasping a single spout and pouch simultaneously from a spout supply and a pouch supply, respectively, then relinquishing the spout and pouch simultaneously to the rotary machine.

16 Claims, 2 Drawing Sheets

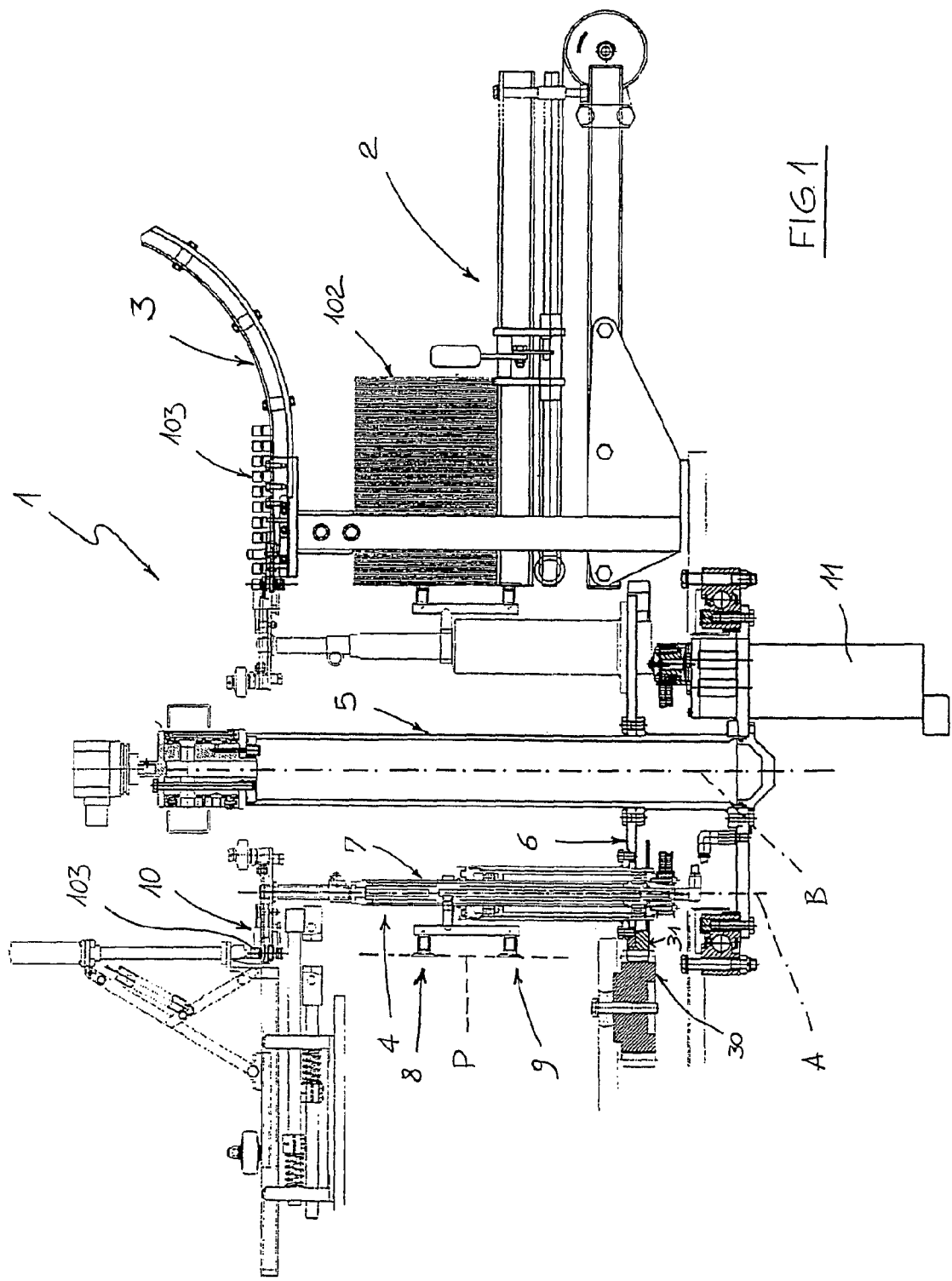

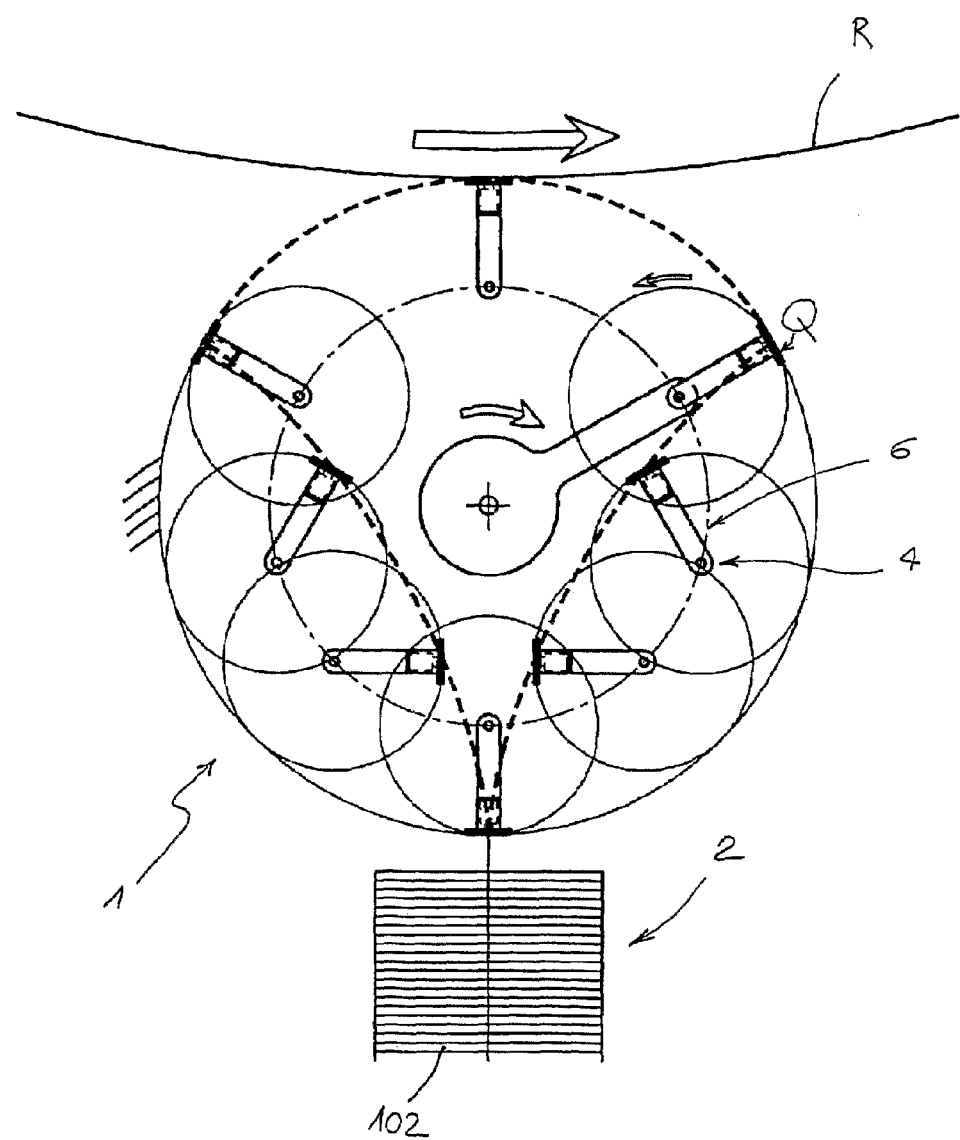

APPARATUS AND METHOD FOR FEEDING POUCHES AND SPOUTS FOR PROCESSING

RELATED APPLICATIONS

This application is a U.S. national phase application of International Patent Application No. PCT/IT2004/000506 titled APPARATUS FOR FEEDING POUCHES AND THEIR RESPECTIVE SPOUTS TO A ROTARY MACHINE FOR THE PROCESSING OF THE SAME AND RELATIVE METHOD, filed on Sep. 17, 2004, which is incorporated in its entirety by reference.

BACKGROUND OF THE INVENTION

The present invention relates to an apparatus for feeding pouches and spouts to a machine, for example, a machine for inserting a spout into a pouch, filling the pouch, etc. Preferably a seal is created between the spout and pouch, and the spout-pouch assembly is fed into a rotary machine which is used to fill the pouch with a product, such as a beverage.

It is common in the industry to provide juices and sports drinks inside flexible containers, commonly called "pouches". The flexible containers usually include a flexible pouch, often made of polyethylene, and include a spout through which the contents of the pouch can flow. For example, the contents can be forced out of the pouch by exerting adequate pressure on the pouch, for example, by squeezing it.

Flexible containers or pouches are often formed from a pair of polyethylene sheets peripherally sealed and having an opening where the spout is inserted and welded in place. More specifically, the sealing operation often involves partially melting the edges of the opening, causing them to adhere to the portion of the spout that is inserted into the pouch. In accordance with procedures known in the art, the spout is inserted into the inlet before filling the container.

During manufacture, the spout is often inserted inside the opening of the container before the container is filled. Systems are known in the art for processing pouches comprising various rotary machines with starwheels having different functions working together. For example, a system can include a starwheel for picking up and transferring pouches that works with a starwheel for filling and sealing the pouches.

SUMMARY OF THE INVENTION

The present invention relates to a system and method for continuously feeding pouches and spouts to a processing machine, for example, a machine that inserts and seals the spout partially within the pouch. The processing machine preferably also processes the pouches in a continuous manner.

In accordance with an embodiment of the invention, a transferring assembly transfers a spout and a pouch to a rotary machine for processing. Preferably, the spout and pouch are picked up and transferred to the rotary machine simultaneously. In accordance with an exemplary embodiment of the invention, the transferring assembly picks up a single spout and a single pouch from respective supplies, such as magazines.

One embodiment of the invention provides gripping devices for picking up and releasing the spout and pouch. Preferably, the gripping devices are aligned and the spout and pouch are aligned, thus permitting simultaneous engagement of the gripping devices and the spout and pouch.

It is an object of the present invention to provide an apparatus that can continuously feed pouches and their respective spouts to a machine, such as a rotary machine, for processing of the same.

Further, it is an object of the present invention to create an apparatus to simultaneously feed pouches and spouts to a rotary machine for processing of the same.

Additionally, it is an object of the present invention to present an apparatus for feeding pouches and their respective spouts with increased productivity.

It is also an object of the invention to provide a system for transferring pouches and spouts from supply magazines to rotary machines safely and without damage while enhancing productivity.

Moreover, it is an object of the present invention to present an apparatus for feeding pouches and their respective spouts which is relatively easy to construct and reliable.

It is further an object of the present invention to present a relatively simple method for feeding pouches and spouts to a rotary machine.

The invention accordingly comprises the features of construction, combination of elements, and arrangement of parts, which will be exemplified in the construction hereinafter set forth, and the scope of the invention will be indicated in the claims.

The invention accordingly comprises the several steps and the relation of one or more of such steps with respect to each of the others, and the apparatus embodying features of construction, combination(s) of elements and arrangement of parts which are adapted to effect such steps, all as exemplified in the following detailed disclosure, and the scope of the invention will be indicated in the claims.

BRIEF DESCRIPTION OF THE INVENTION

For a fuller understanding of the invention, reference is had to the following description, taken in connection with the accompanying drawings, in which:

FIG. 1 is a cross sectional view of a system for feeding pouches and spouts to a machine in accordance with an embodiment of the invention; and FIG. 2 is a schematic diagram of the operation of a system in accordance with an embodiment of the invention.

DETAILED DESCRIPTION OF PREFERRED EMBODIMENTS

A system is provided for feeding pouches and spouts to an apparatus for processing the pouches and spouts. For example, the apparatus can be used for inserting the spout into the pouch, sealing the spout in place, filling the pouch, etc. Preferably the apparatus continuously transfers the pouch from station to station, wherein a different function is performed at each station. The apparatus can be a rotary machine, by way of non-limiting example, a pouch-forming starwheel equipped with welding grippers to weld the spouts to the pouches.

It is common for pouches to be assembled directly on the welding starwheels. By way of non-limiting example, the pouches can be brought to a first station at which the pouches are opened. At a subsequent station, the pouches are opened, and a spout is partially inserted through the opening. The pouch is moved to a subsequent station at which the edges of the pouch is welded onto the spout. For such a system, it can be preferable for the pouches and the spouts to be continuously fed to the rotary machine which can increase efficiency.

An exemplary embodiment of system 1 is shown in FIG. 1, which comprises a first magazine 2 comprising a plurality of pouches 102 and a second magazine 3 comprising a plurality of spouts 103. Preferably, the number of pouches and spouts are equal. The system 1 further comprises a transferring assembly 4 constructed and arranged to pick up a pouch 102 and a spout 103 from their respective magazines 2, 3. Transferring assembly 4 then transfers the pouch 102 and spout 103 from the magazines 2, 3 to a rotary machine.

In the example illustrated, the transferring assembly 4 is secured to a rotating platform 6 connected to a first support shaft 5. As shown, the transferring assembly 4 also comprises a second support shaft 7 preferably rotatable around a first axis A, between a first position and a second position. At the first position, the transferring assembly 4 picks up a pouch 102 and a spout 103. At the second position, the transferring assembly 4 transfers the pouch 102 and spout 103 to the rotary machine. Both positions are illustrated in FIG. 1.

In accordance with an exemplary embodiment of the invention, the second support shaft 7 comprises a mechanism for picking up a pouch 102. Referring to the exemplary embodiment illustrated in FIG. 1, such a mechanism includes of a pair of suction cups 8, 9 for grasping a pouch. Suction cups 8,9 are preferably vertically aligned such that the face of suction cups 8, 9 are on the same vertical plane P. Also illustrated in the exemplary embodiment of FIG. 1 is a gripper 10 also connected to the second support shaft 7, the gripper 10 being constructed and arranged to grasp and retain a spout 103. As shown, the second support shaft 7 can be attached to the rotating platform 6, which rotates about a second axis B, which preferably substantially coincides with the center of the first support shaft 5. Preferably, both first support shaft 5 and second support shaft 7 are substantially vertical. More preferably, the second support shaft 7 preferably revolves around the first axis A and the rotating platform 6 rotates around the second vertical axis simultaneously. Therefore, the suction cups 8, 9 and the gripper 10 can be activated by hypocycloid movement as they travel from magazines 2 and 3 to the rotary machine.

Preferably, the rotating platform 6 is moved by the rotary machine for the processing of pouches and spouts, for example through a mechanical coupling of toothed gears 30 integral to the rotary machine and corresponding toothed gears 31, integral to the rotating platform 6. In the example illustrated in FIG. 1, the second rotating shaft 7 is preferably moved by an electric motor 11 secured and integral to the rotating platform 6.

Referring to the exemplary embodiment shown, the system 1 for feeding pouches and their respective spouts comprises a single rotating platform 6 and several second rotating shafts 7. Each of the second rotating shafts 7 are equipped with at least a pair of suction cups 8, 9 for picking up and retaining a pouch 102 and at least one gripper 10 for picking up and retaining a spout 103.

A method for feeding pouches and spouts to a rotary machine for the processing of the same preferably comprises arranging a magazine 2 of pouches and a magazine 3 of spouts, picking up a pouch 102 from magazine 2, picking up a spout 103 from magazine 3, transferring the pouch 102 and spout 103 to a discharge point on a rotary machine, and releasing the pouch 102 and spout 103. Preferably, the method includes picking up a pouch 102 and spout 103 simultaneously, and feeding both to the rotary machine simultaneously. More preferably, the system 1 provides picking up, transferring and releasing the pouches and spouts to the rotary machine continuously.

In accordance with a preferred embodiment of the invention, a hypocycloid movement of the pouches 102 and spouts 103 is provided from the magazines 2,3 to the discharge point on the rotary machine.

In accordance with an exemplary embodiment of the invention, the rotating platform 6 is powered directly by the rotary machine for processing the pouches 102 and spouts 103. For example, the movement of the toothed gears 30 of the rotary machine results in the movement of the toothed gears 31 of the rotating platform 6 which activates the second support shaft 7.

In the embodiment shown, simultaneous to the rotation of the rotary machine and rotating platform 6, the support shaft 7 rotates around the first axis A. The support shaft 7 can be rotated by an electric motor 11 integrally secured to rotating platform 6. Therefore, the suction cups 8, 9 and the gripper 10 are moved by hypocycloid movement, traveling from the area where the pouches 102 and spouts 103 are picked up from their magazines 2, 3 to the area where the pouches and spouts are transferred to and released to the rotary machine for the processing of the pouches and spouts, indicated as R in FIG. 2.

Referring to FIG. 2, a top view of the trajectory of movement of the suction cups 8,9 and the gripper 10 is generally indicated as Q. Because suction cups 8,9 and gripper 10 are vertically aligned, their trajectories of movement coincide when viewed from above. More particularly, trajectory Q includes a cusp at magazines 2,3. Accordingly, at magazines 2,3, the suction cups 8,9 and the gripper 10 stops momentarily while picking up a pouch 102 and a spout 103, respectively. This momentary pause preferably prevents "wrenching" the pouch 102 and spout 103 from magazines 2, 3.

After picking up a pouch 102 and spout 103, suction cups 8,9 and gripper 10 follow a trajectory Q substantially resembling a circumferential arc. Preferably, the tangent of the arc of trajectory Q and the tangent of the arc of the rotary machine R coincide at the discharge point whereat suction cups 8,9 and gripper 10 release the pouch 102 and spout 103, and the rotary machine grasps the pouch 102 and spout 103. Furthermore, the tangential speed of suction cups 8,9 and gripper 10 and rotary machine are substantially equal. Therefore, the suction cups 8,9 and gripper 10 can transfer the pouches 102 and spouts 103 to the rotary machine R with precision. Additionally, such a system can provide pouches 102 and spouts 103 in a continuous manner, thus enhancing efficiency and thus productivity compared to a system wherein the pouches and spouts are not provided continuously.

Preferably, a system in accordance with a preferred embodiment of the invention simultaneously feeds a rotary machine with a plurality of pouches and spouts, one at a time, in a continuous and fluid manner. Additionally, by transferring both the pouch and the spout by a common transferring assembly 4, an apparatus in accordance with a preferred embodiment of the invention can be compact and reliable. Whereas the system 1 as shown in FIG. 1 includes two transferring assemblies 4, it is to be understood that the system 1 can include one, two or more transferring assemblies 4 without deviating from the scope of the invention.

The examples provided herein are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the transferring assembly can include one, three, or any other number of suction cups to pick up the pouches. Alternatively, the pouches can be picked up using another device, rather than a suction cup, by way of non-limiting example, an adhesive, a negative pressure device, a gripper. Likewise, the spouts can be picked up using a variety of devices other than a gripper, as matter of application specific design choice.

The system in accordance with the invention are also intended to include systems comprising a different number of support shafts, and actuating mechanisms other than toothed gears. Additionally, the transferring assembly, the gripper, etc. can comprise different structures than those described without deviating from the scope of the invention as a matter of application specific design choice. Furthermore, the magazines of spouts and pouches can be a source of spouts and pouches, and not limited to a certain number of spouts and pouches. Additionally, the magazines may provide an organized collection of spouts and pouches. For example, a plurality of spouts and/or pouches being provided to the system can be continuously arranged in a row, a stack, etc. to be transferred to an apparatus such as a rotary machine. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

I claim:

1. A system for providing pouches and spouts to an apparatus, the system comprising:
    a plurality of pouches;
    a plurality of spouts;
    a transferring assembly having a first gripping mechanism for grasping a spout and a second gripping mechanism for grasping a pouch constructed and arranged to simultaneously remove a single pouch from the plurality of pouches and a single spout from the plurality of spouts, the transferring assembly simultaneously transferring the single pouch and the single spout to an apparatus.

2. The system of claim 1, wherein the apparatus comprises a rotary machine.

3. The system of claim 1, wherein the transferring assembly is constructed and arranged to transfer a plurality of pouches and spouts in a continuous manner.

4. The system of claim 1 and wherein the first gripping mechanism includes a gripper and the second gripping mechanism includes one or more suction cups.

5. The system of claim 1, wherein the transferring assembly includes a first suction cup having a first face and a second suction cup having a second face, wherein the first suction cup and the second suction cup are aligned such that the first face is on the same plane as the second face.

6. The system of claim 1, wherein the transferring assembly includes a gripper and a suction cup having a face, wherein the gripper and the face of the suction cup are aligned.

7. The system of claim 1, further comprising a support shaft, wherein the transferring assembly includes a second support shaft constructed and arranged to revolve about the support shaft.

8. The system of claim 7, wherein the second support shaft is constructed and arranged to rotate about an axis.

9. The system of claim 7, wherein the second support shaft is connected to the first support shaft via a rotating platform constructed and arranged to rotate about a second axis, such that when the rotating platform rotates, the second support shaft also rotates.

10. A system of claim 9, wherein the transferring assembly comprises a gripper for gripping a spout and one or more suction cups for retaining a pouch, wherein the gripper and the suction cups move in a hypocycloid manner as the rotation platform rotates, the gripper and the suction cups transferring a spout and a pouch to the apparatus.

11. The system of claim 9, wherein the rotating platform is connected to the first support shaft such that when the first support shaft rotates the rotating platform rotates.

12. The system of claim 11 wherein the rotating platform comprises an actuator.

13. The system of claim 12 wherein the actuator includes an electric motor.

14. The system of claim 1, wherein the plurality of spouts comprises a magazine of spouts and the plurality of pouches comprises a magazine of pouches.

15. The system of claim 1, wherein the first and second gripping mechanisms are constructed and arranged to pause when contacting the spout and the pouch.

16. The system of claim 1, wherein the first and second gripping mechanisms move at substantially the same speed and direction as a corresponding receiving device of the apparatus, the receiving device constructed and arranged to receive the spout and the pouch from the transferring assembly.

* * * * *